United States Patent [19]

Wanker et al.

[11] 3,952,889

[45] Apr. 27, 1976

[54] APPARATUS FOR COLLECTING COMBINE WASTE

[75] Inventors: William C. Wanker, Culver; James J. Quinn; Fred E. Kirby, both of Madras, all of Oreg.

[73] Assignee: Foster Manufacturing Company, Inc., Madras, Oreg.

[22] Filed: Nov. 18, 1974

[21] Appl. No.: 524,781

[52] U.S. Cl. .............................. 214/42 R; 214/519; 302/37; 302/38
[51] Int. Cl.² ........................................ B65G 67/22
[58] Field of Search ............ 214/42 R, 42 A, 83.28, 214/519; 302/37, 38; 280/34 A

[56] References Cited
UNITED STATES PATENTS

| | | | |
|---|---|---|---|
| 1,490,404 | 4/1924 | Ronning et al. | 302/37 |
| 1,940,531 | 12/1933 | Bullock | 198/167 |
| 2,461,577 | 2/1949 | Stark | 280/34 A |
| 3,317,064 | 5/1967 | Fingerut | 214/42 R |

*Primary Examiner*—Robert G. Sheridan
*Attorney, Agent, or Firm*—Dawson, Tilton, Fallon & Lungmus

[57] ABSTRACT

An improved combine waste collection system includes a frame which breaks down into a forward section and a rear section. The rear section of the frame is provided with wheels, and it supports a dump wagon in which the waste is collected and stored. The forward portion of the frame is telescopically extensible, and it includes a conveyor which collects waste from the combine and carries it to a blower, operated at a higher speed, for taking the waste material from the conveyor and forcing it into the dump wagon. A modification includes a powered paddle wheel to assist in feeding larger pieces of straw or the like into the blower.

8 Claims, 6 Drawing Figures

APPARATUS FOR COLLECTING COMBINE WASTE

BACKGROUND AND SUMMARY

The present invention relates to improvements in apparatus for collecting combine waste. The apparatus of the present invention is useful with different types of combines, and it is not limited to use with any particular combine.

Typically, a combine collects the material being harvested and separates the useful cash crop (the grain) from the chaff and straw. It may also separate the straw. The cash crop is separated by means of a shaker sieve, and it is deposited at a forward position in the combine. Rearwardly of the cash crop, the chaff is separated and deposited at the forward portion of the combine hood which is located toward the rear of the combine and extends above the ground. At the rear portion of the hood, the straw is collected and deposited.

A waste collection system of the type with which the present invention is concerned collects the chaff and straw from the combine and forces them into a rear dump wagon which collects and stores the material until it is full. When the dump wagon is full, the contents may be dumped at a selected location; and after dumping, the contents may be transported elsewhere, if desired.

The waste collection apparatus attaches to the combine and is pulled behind it. The term "waste" is meant to refer to chaff, straw shuck-lage or other harvest by-products, since the apparatus may be used to collect material from any crop that is harvested by a combine.

In the prior system identified above, there is a bin or funnel located beneath the combine hood for collecting the waste material. There are a number of problems with this type of system. The material does not flow into the funnel well since it relies solely on gravity to force the material into the funnel.

Recent improvements in combines have required larger hoods, and the hoods have become longer, wider and lower, thereby reducing the space within which a collection apparatus could fit. In some existing collection systems, including that mentioned above, trying to accommodate to the larger combine hoods, it became apparent that material began collecting on the funnel or other collection device, thereby resulting in a decreased collection efficiency.

The present invention uses a horizontal conveyor which is located beneath the combine hood and receives the waste material as it is discharged from the combine. The conveyor transports the waste material to a blower located on the apparatus spaced from the rear of the combine so as to avoid interference. An independent motor drives both the conveyor and the blower, the blower being driven at a higher speed so there is no accumulation of material at the feed end of the blower.

The combination of a horizontal conveyor and rearwardly spaced blower enables the apparatus to achieve a lower profile in order to fit within the restricted space provided by modern combines, and it further permits the same apparatus to fit combines of different widths, merely by changing side pans on the conveyor. The independent drive enables the blower to work at a faster speed; and this, combined with the ability to select the flights on the conveyor, enables one to work with a much wider variety of materials than had been possible heretofore. For example, in addition to wheat which is most common, the present invention may also be used with corn, oats, barley, beans, alfalfa, clovers, milo maise, sorghum, or even peanuts.

The apparatus of the present invention includes a frame which separates into two sections at approximately the midsection. The rear section of the frame is provided with trailing support wheels, and it carries the dump wagon which stores the waste material from the blower. The forward end of the frame supports the blower and the conveyor; and this portion of the frame is further provided with a telescopic extension so that the frame may accommodate combines having hoods of different lengths, simply by changing the length of the forward portion of the frame and using a different conveyor belt. The independent motor, which is a gasoline engine is supported by both frame sections.

The various features and advantages of the present invention in addition to those mentioned above will be apparent to persons skilled in the art from the following detailed description of a preferred embodiment accompanied by the attached drawing wherein identical reference numerals will refer to like parts in the various views.

THE DRAWING

DETAILED DESCRIPTION

Figure 1:
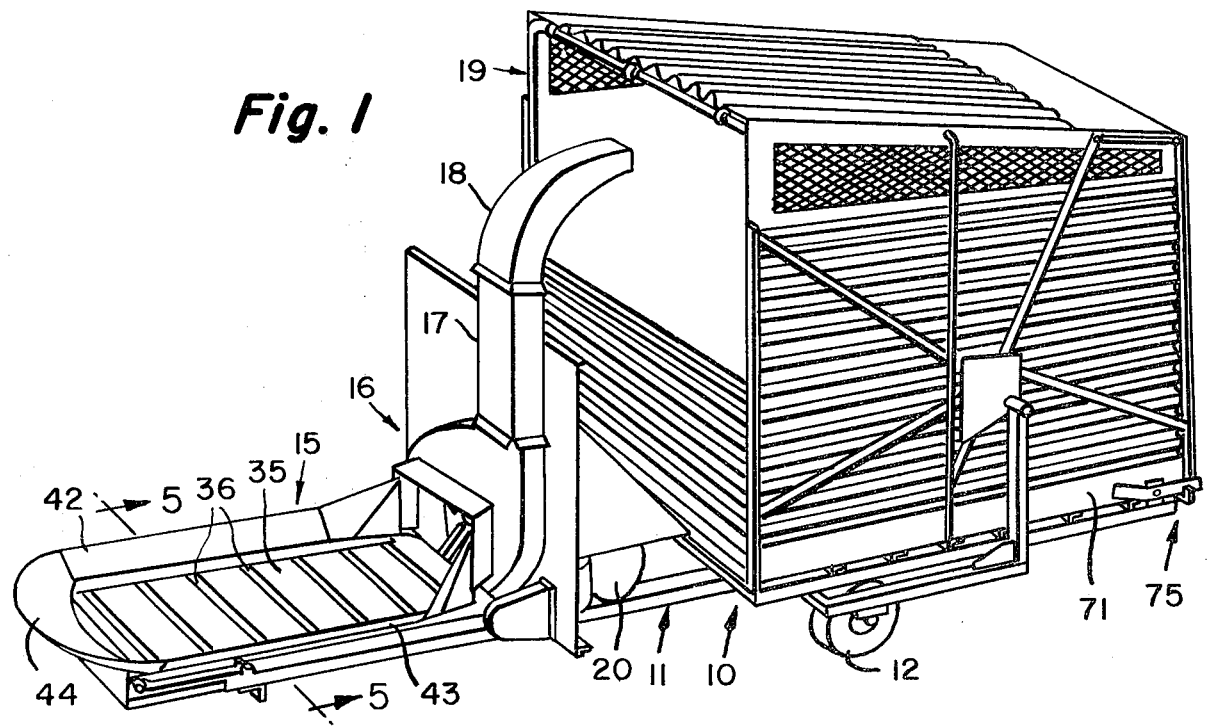
FIG. 1 is an upper perspective view of apparatus constructed according to the present invention.

Referring first to FIG. 1, reference numeral 10 generally designates apparatus for receiving and accumulating waste material from a combine. The forward end of the apparatus is toward the left of the drawing.

Figure 2:
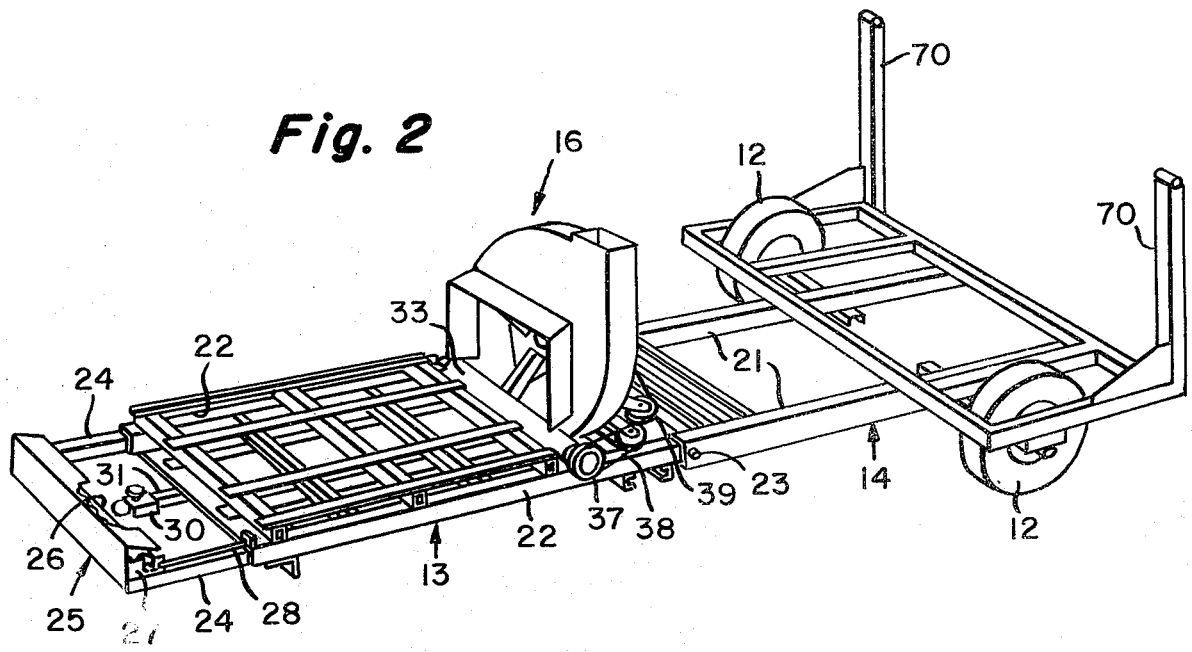
FIG. 2 is a view similar to FIG. 1 with portions of the conveyor and the dump wagon removed to show the frame.

The apparatus includes a frame generally designated 11 provided with rear support wheels 12 and comprising a forward section 13 and a rear section 14 (see FIG. 2). Located at the forward end of the frame 11 is a conveyor generally designated 15 which receives material discharged from the hood of a combine and feeds it toward a blower generally designated 16. The blower 16 forces the material upwardly through a conduit 17 and directed rearwardly by an elbow 18 into a dumping box generally designated 19. Both the blower 16 and the conveyor 15 are driven by a conventional gasoline engine partially illustrated at 20 in FIG. 1 and located on the frame 11 behind the blower 16.

Turning now to FIG. 2, the rear section 14 of the frame 11 includes first and second tubular side frame members 21 which receive corresponding smaller tubular side frame members 22 of the forward section 13. Each frame member 21 is connected to its associated frame member 22 by means of a pin or bolt 23. By removing the pins 23, the entire frame may be broken apart into a forward section and a rear section; and this has been found to be very useful for shipping from the manufacturer to dealer or to customer.

The side frame members 22 of the forward frame section 13 are also tubular members, and they telescopically receive side frame members 24 of a forward extension generally designated 25. One of the rollers for the conveyor, designated 26, is journalled in side brackets, one of which is shown at 27 on the extension 25. The extension 25 is held at a predetermined setting relative to the tubular side frame members 22 by means of a rod 28, after the desired setting has been achieved. Thus, the conveyor portion of the forward frame section is extensible so that it can be adjusted to different combines since the hoods of different combines vary in length.

Thus, the conveyor 15 is placed beneath the hood of a combine, and the waste material discharged from the combine hood is deposited under gravity onto the conveyor. The apparatus is attached to the combine by means of a hitch 30 which is shown in its use position. The hitch 30 is attached to a tongue 31 which may be extended to a forward position wherein the hitch is located forward of the extension 25; and this facilitates towing of the apparatus when it is not in use. This structure further permits adjustment for other combines.

The roller 26 mentioned above is an idler roller, and at the other end of the conveyor section is a drive roller designated by reference numeral 33. A conveyor belt 35 (see FIG. 1) provided with spaced flights 36 is trained about the rollers 26, 33. The closer end of the drive roller 33 is provided with a double-track pulley 37 which is driven by means of a belt 38 fed over two guide pulleys designated 39. Belt 38 is also fitted over a drive pulley 40 (see FIG. 4) which is driven by a shaft 41. The shaft 41, in turn, carries a larger pulley 40A which is driven by an independent gasoline engine through belt 40B.

Figure 5:
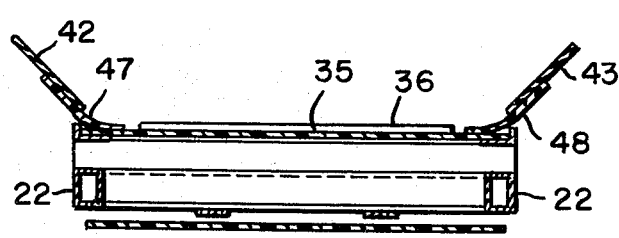
FIG. 5 is a transverse cross sectional view of the conveyor taken through the sight line 5—5 of FIG. 1.

Referring now to FIGS. 1 and 5, the conveyor section is provided with first and second side pans 42, 43 and a forward catch pan 44. Thus, the effective area over which material being discharged from a combine hood is collected is larger than the area of the conveyor belt 35 taken alone. It will be appreciated that the side pans 42, 43 can be adjusted in size so that the conveyor section will accommodate combine hoods of different widths.

Referring particularly to FIG. 5, flexible strips 47, 48 are secured lengthwise of the side pans 42, 43 respectively and are curved above the conveyor belt 35 so as to guide material toward the center of the conveyor belt where it is picked up by the flights 36.

As has already been mentioned, waste material is discharged from a combine hood both at a forward and a rear location of the hood. With the conveyor as described above, it is possible to selectively collect only at the front, or the front and rear by covering the portion of the conveyor at which the undesired waste material would otherwise be deposited. That which is not collected simply falls to the ground.

Figure 3:
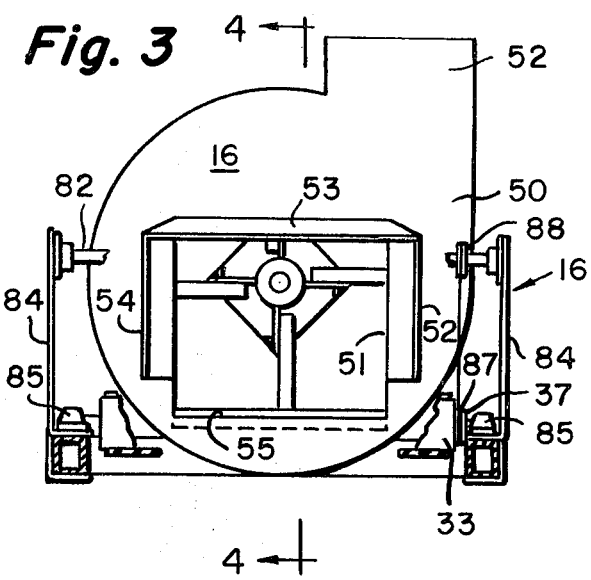
FIG. 3 is a front view looking into the blower, showing the frame in cross section and portions of the optional paddle wheel assembly.
Figure 4:
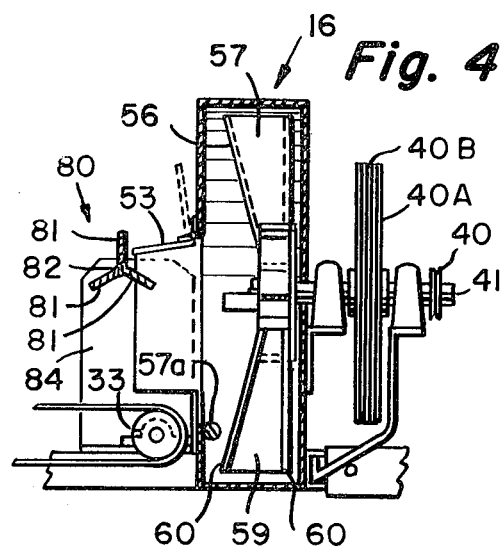
FIG. 4 is a fragmentary vertical cross sectional view taken through the sight line 4—4 of FIG. 3.

Turning now to FIGS. 3 and 4, the blower 16 is shown in more detail as including a housing 50 provided with a forward rectangular intake opening 51. Material exits through a discharge spout 52 which is coupled to the previously described conduit 17. A shroud 53 is provided at the upper edge of the intake opening 51; and in the operative position shown in solid, the shroud 53 extends forwardly and downwardly to prevent blowout of the material fed into the blower 50 as well as to deflect any material from the combine back onto the conveyor so that it can be fed in toward the bottom of the blower.

When it is desired to assist feeding the material collected on the conveyor into the blower (as is the case particularly with larger material such as straw), a driven paddle wheel generally designated 80 in FIGS. 4 and 6, and described more below, may be used. In this case, the shroud 53 is raised to the position shown in dotted line in FIG. 4.

Side deflector plates 54 are also provided for funneling material from the conveyor into the intake opening 51 to the blower 50.

It will be observed from FIG. 4 that the lower horizontal edge 55 of the blower intake opening is located well below the center of the axis of rotation of the blower fan, designated 56. The fan 56 includes impeller blades 57 for creating the draft. Thus, material is fed from the conveyor into a portion of the blower which has a fairly high pressure, and we have found that there had been a tendency to blow the material back out. However, we have overcome this problem by introducing a transverse deflector designated 57a inside the blower housing immediately adjacent the lower edge 55 of the blower intake. This provision, material and air being forced by the blades 57 of the blower fan 56, particularly light materials, are forced back into the blades and away from the inlet opening 51.

It will be observed that the blades 57 are in general form of a right triangle, widening as the distance from the drive shaft 41 increases. Thus, the blades 57 of the fan 56 have a larger area where the pressure within the blower is greater. Further, each blade 57 is in the form of a U-shaped channel when viewed in cross section. It includes a radial flat portion 59, as seen in FIG. 4, and outwardly extending side portions 60 for scooping material and reducing the tendency of material being forced by the blower to slip off the fan blades.

Returning again to FIGS. 1 and 2, the rear section 14 of the frame 11 is provided with first and second upright pivot arms 70, at the upper end of which the bin 71 is pivotally mounted. The bin 71 is held in its lowered, operating position as shown in FIG. 1 by means of a conventional holding mechanism, not shown. When the holding mechanism is tripped, the wagon will dump due to heavy loading behind, or a hydraulic cylinder may be used to tilt the bin 71 about its pivotal supports to dump the stored material, after the rear door of the bin 71 has been unlatched by the first tilting movement, as at 75.

In a preferred embodiment, the walls of the bin 71 are mounted at their lower edges with piano hinges so that they may be folded inwardly in interlaced fashion for storing or shipment—that is, one on top of the other. Thus, the bin may be collapsed when not in use. Otherwise, its construction is conventional.

It has also been found useful to provide dual wheels in place of the single side wheels shown at 12 in order to jump ditches, straddle furrows, or if it is desired to add a larger bin so as to increase capacity of the apparatus.

Figure 6:
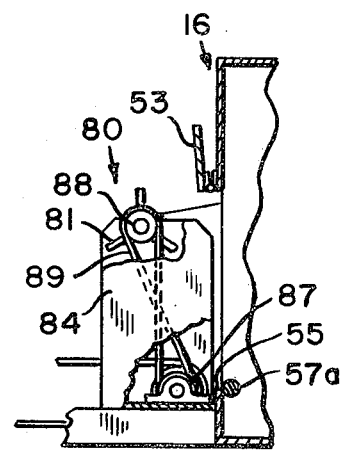
FIG. 6 is a fragmentary side view showing the drive for the paddle wheel assist.

Returning now to the paddle wheel assist 80, the support for which is shown in FIG. 3, and portions of which are also shown in FIGS. 4 and 6, as mentioned, it is used primarily to assist feeding large straw into the blower. It is located in front of and toward the upper portion of the opening 51 into the blower, when used.

The paddle wheel assembly includes a number of blades 81 which are mounted on a shaft 82 extending horizontally across the front of a blower. The shaft 82 is journalled in mounts which are secured to upright supports 84. The supports 84 are mounted to the bearing blocks 85 which support the roller 33. The previously identified pulley 37 which drives the roller 33 is provided with an inner track 87, and a corresponding upper pulley 88 is affixed to the shaft 82. A flexible belt 89 (in the form of a "figure 8", as seen in FIG. 6, to obtain the proper rotational direction of the blades 81) is entrained about the track 87 and pulley 88. That is, the shaft 82 is rotated in a counterclockwise direction as seen in FIGS. 4 and 6 to help force the material into the blower.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

We claim:

1. In combination with a combine having a rearwardly extending hood located above the ground and discharging waste material downwardly under gravity from said hood, apparatus for collecting said waste material comprising: a frame provided with supporting wheels and extending forwardly thereof and mounted to said combine; conveyor means carried by the forward end of said frame and located beneath said hood of said combine when said frame is attached thereto, said conveyor receiving said waste material under gravity flow; blower means on said frame having an inlet opening extending in a generally vertical plane for receiving material from said conveyor means and forcing the same through a discharge conduit; independent power means on said frame for supplying power to drive said blower means and said conveyor means; said power means including means for operating said blower means at a higher discharge rate than the delivery rate of said conveyor means to prevent accumulation of material received from said combine adjacent the inlet opening of said blower means; and collection bin means mounted on the rear of said frame above said wheels for collecting material forced through said discharge conduit.

2. The apparatus of claim 1 wherein said frame comprises an integral rear section, an integral forward section; and means for releasably securing said rearward section and said forward section into a unitary frame, while permitting said sections to be separated for shipment.

3. The apparatus of claim 2 wherein said rear frame section comprises a pair of side tubular frame members and said forward frame section includes a pair of side tubular frame members aligned with and received in said side tubular frame members of said rear section when said forward section is assembled thereto.

4. The apparatus of claim 2 wherein said forward frame section comprises the first frame portion and an extensible forward frame portion, whereby said forward frame section may be elongated to accommodate said conveyor means to combines having hoods of different length.

5. The apparatus of claim 4 wherein said blower is mounted on said first frame portion of said forward frame section, and wherein said conveyor means comprises a driven conveyor roller carried by said first frame portion of said forward frame section and located adjacent the inlet opening of said blower means; an idler roller mounted on said extensible portion of said forward frame section; and a conveyor belt journalled about said driven roller and said idler roller for conveying material deposited thereon into the inlet opening of said blower means.

6. The apparatus of claim 1 further comprising first and second side pans mounted to the forward portion of said frame adjacent said conveyor means for expanding the effective width of said apparatus and to accommodate it to combines of different width while maintaining the width of said conveyor means constant.

7. The apparatus of claim 1 further comprising paddle wheel means driven by said power means having a plurality of elongated blades mounted in front of said opening and above the discharge end of said conveyor to assist in forcing material discharging from said conveyor into said blower.

8. Apparatus for collecting waste material from a combine comprising:
A frame provided with supporting wheels and extending forwardly thereof and adapted to be mounted to a combine;
conveyor means carried by the forward end of said frame and located beneath the hood of a combine when said frame is attached thereto;
blower means on said frame receiving material from said conveyor means and forcing the same through a discharge conduit;
independent power means on said frame for supplying power to drive said blower means and said conveyor means; and collecting bin means mounted on the rear of said frame above said wheels for collecting material forced through said discharge spout;
said blower means comprising:
a housing defining an inlet opening, the lower edge of said inlet opening located adjacent the discharge end of said conveyor means and located adjacent the edge of said housing whereby material may be fed into a high pressure located within said blower means,
a fan in said blower including a plurality of blades,
deflector means in said housing adjacent said lower edge of said inlet opening for preventing blowout of light materials from said housing, and
a deflector plate extending forwardly and downwardly from the upper edge of said inlet opening.

* * * * *